(12) United States Patent
Kitawaki et al.

(10) Patent No.: US 12,205,616 B2
(45) Date of Patent: Jan. 21, 2025

(54) IMPACT RESISTANT MAGNETIC DISK DEVICE AND METHOD FOR MANUFACTURING IMPACT RESISTANT MAGNETIC DISK DEVICE

(71) Applicants: UACJ CORPORATION, Tokyo (JP); FURUKAWA ELECTRIC CO., LTD., Tokyo (JP)

(72) Inventors: Kotaro Kitawaki, Tokyo (JP); Ryohei Yamada, Tokyo (JP); Shinpei Todo, Tokyo (JP); Hideyuki Hatakeyama, Tokyo (JP)

(73) Assignees: UACJ CORPORATION, Tokyo (JP); FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 18/547,621

(22) PCT Filed: Feb. 14, 2022

(86) PCT No.: PCT/JP2022/005725
§ 371 (c)(1),
(2) Date: Aug. 23, 2023

(87) PCT Pub. No.: WO2022/185892
PCT Pub. Date: Sep. 9, 2022

(65) Prior Publication Data
US 2024/0170017 A1    May 23, 2024

(30) Foreign Application Priority Data

Mar. 5, 2021    (JP) ................................. 2021-035203

(51) Int. Cl.
*G11B 17/038*    (2006.01)
*G11B 5/82*    (2006.01)
(Continued)

(52) U.S. Cl.
CPC .............. *G11B 17/038* (2013.01); *G11B 5/82* (2013.01); *G11B 17/0287* (2013.01); *G11B 19/2009* (2013.01); *G11B 25/043* (2013.01)

(58) Field of Classification Search
None
See application file for complete search history.

(56) References Cited

U.S. PATENT DOCUMENTS 10,734,018 B1 *  8/2020  Uehara ................ G11B 25/043
2009/0083772 A1    3/2009  Miyamori et al.
(Continued)

FOREIGN PATENT DOCUMENTS

DE    3942119 A1 *  6/1990  ........... G11B 17/038
JP    2003-257154 A *  9/2003  ........... G11B 17/038
(Continued)

OTHER PUBLICATIONS

ISR issued in PCT/JP2022/005725, mailed Apr. 19, 2022.
(Continued)

*Primary Examiner* — Craig A. Renner
(74) *Attorney, Agent, or Firm* — Greer Burns & Crain Ltd.

(57) ABSTRACT

A magnetic disk device includes a plurality of disk-shaped magnetic disks, a spacer, a hub, and a clamp. Each of the magnetic disks includes a through-hole in a center section thereof. The spacer is disposed among the magnetic disks, and includes a through-hole in a center section thereof. The hub is inserted into the through-holes of the magnetic disks and the spacers. The clamp presses and holds the magnetic disks and the spacer. At surfaces where the magnetic disks and the spacer or the clamp contact, a flat surface height of an upper surface of at least one magnetic disk that contacts an outer circumference of the spacer or the clamp is lower than a flat surface height of the upper surface of at least one (Continued)

magnetic disk of the magnetic disks that contacts an inner circumference of the spacer or the clamp.

13 Claims, 4 Drawing Sheets

(51) Int. Cl.
   *G11B 17/028* (2006.01)
   *G11B 19/20* (2006.01)
   *G11B 25/04* (2006.01)

(56) References Cited

U.S. PATENT DOCUMENTS

| | | |
|---|---|---|
| 2010/0014190 A1 | 1/2010 | Kohei et al. |
| 2010/0232060 A1 | 9/2010 | Hanlon et al. |

FOREIGN PATENT DOCUMENTS

| | | |
|---|---|---|
| JP | 2010211909 A | 9/2010 |
| JP | 2010267347 A | 11/2010 |
| JP | 2013030268 A | 2/2013 |
| JP | 5392075 B2 | 1/2014 |
| JP | 2018156710 A | 10/2018 |
| WO | 2006075639 A1 | 7/2006 |
| WO | 2008139537 A1 | 11/2008 |

OTHER PUBLICATIONS

Office Action issued in corresponding Japanese patent application No. 2021-035203, dated Oct. 19, 2021.

Written opinion of the ISA, issued in PCT/JP2022/005725, mailed Jan. 25, 2022.

* cited by examiner

FIG. 1A
FIG. 1B
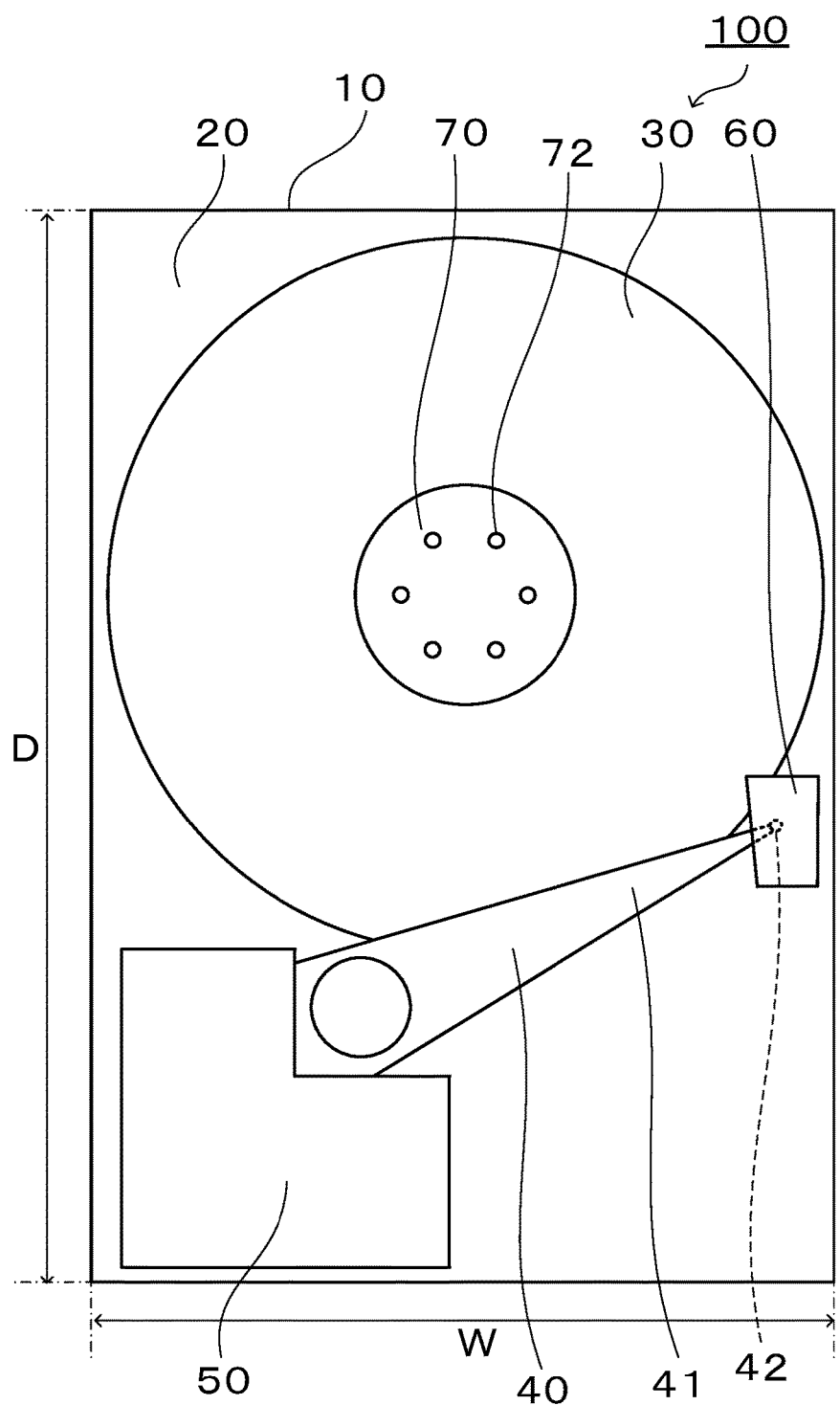
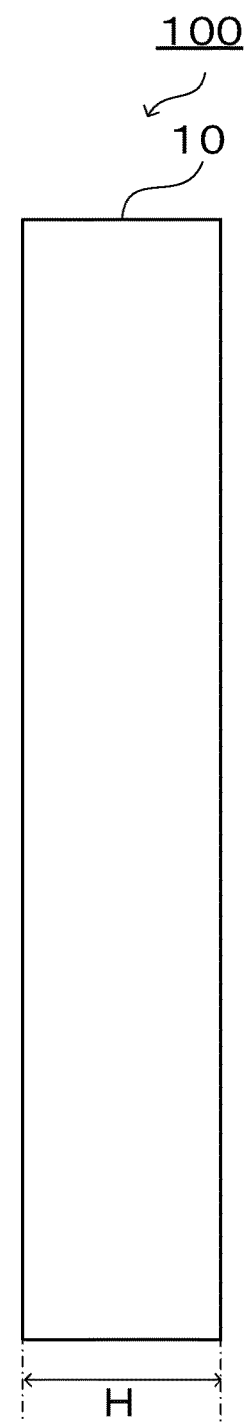

IMPACT RESISTANT MAGNETIC DISK DEVICE AND METHOD FOR MANUFACTURING IMPACT RESISTANT MAGNETIC DISK DEVICE

TECHNICAL FIELD

The present disclosure relates to a magnetic disk device and a method for manufacturing the magnetic disk device.

BACKGROUND ART

The amount of data used by individuals has increased due to the spread of smartphones and smart household appliances. This enormous amount of data is sent over the internet and stored in magnetic disk devices (hard disk drives, HDD) in data centers. There is a need for magnetic disk devices that have increased capacity in order to store this enormous amount of data.

For example, Patent Literature 1 describes an information recording medium glass substrate that is stably fixed to a hub of a spindle motor (SPM) and does not break, even when a magnetic disk recording device in which the SPM is incorporated is subjected to a strong impact.

CITATION LIST

Patent Literature

Patent Literature 1: Japanese Patent No. 5392075

SUMMARY OF INVENTION

Technical Problem

One example for increasing the capacity of a magnetic disk device is the technological trend of increasing the number of magnetic disks mounted in the magnetic disk device and expanding the data area per each magnetic disk device. However, the dimensions of magnetic disk devices are defined by standards and, as such, modifications such as reducing the thickness of the magnetic disks are required to increase the number of mounted magnetic disks. When the thickness of the magnetic disk is reduced, rigidity declines and impact resistance declines. For example, the magnetic disk is more likely to deform when subjected to an impact such as when the HDD is dropped. That is, there is a trade-off relationship between increasing the capacity of the magnetic disk device and the impact resistance of the magnetic disk device, and there is a demand for a magnetic disk device that has excellent impact resistance and high data capacity.

The present disclosure is made with the view of this type of situation, and an objective of the present disclosure is to provide a magnetic disk device that has excellent impact resistance and high data capacity, and a method for manufacturing the magnetic disk device.

Solution to Problem

In order to achieve the objective described above, a magnetic disk device according to a first aspect of the present disclosure includes:
a plurality of disk-shaped magnetic disks, each including a through-hole in a center section thereof;
a spacer that is disposed among the magnetic disks and that includes a through-hole in a center section thereof;
a hub inserted into the through-holes of the magnetic disks and the spacer; and
a clamp pressing and holding the magnetic disks and the spacer; wherein
at surfaces where the magnetic disks and the spacer or the clamp contact, a flat surface height of an upper surface of at least one magnetic disk of the magnetic disks that contacts an outer circumference of the spacer or the clamp is lower than a flat surface height of the upper surface of at least one magnetic disk of the magnetic disks that contacts an inner circumference of the spacer or the clamp.

It is preferable that, at the surfaces where the magnetic disks and the spacer or the clamp contact, a difference between the flat surface height of the upper surface of the at least one magnetic disk of the magnetic disks that contacts the outer circumference of the spacer or the clamp and the flat surface height of the upper surface of the at least one magnetic disk of the magnetic disks that contacts the inner circumference of the spacer or the clamp is −3.0 µm or less.

It is preferable that, for at least a magnetic disk disposed uppermost of the plurality of magnetic disks, at the surfaces where the magnetic disk and the clamp contact, the flat surface height of the upper surface of the magnetic disk that contacts the outer circumference of the clamp is lower than the flat surface height of the upper surface of the magnetic disk that contacts the inner circumference of the clamp.

It is preferable that each of the magnetic disks has a thickness of 0.48 mm or less.

It is preferable that each of the magnetic disks has a thickness of 0.36 mm or less.

In order to achieve the objective described above, a method for manufacturing a magnetic disk device according to a second aspect of the present disclosure, the magnetic disk device including a plurality of disk-shaped magnetic disks, each including a through-hole in a center section thereof, a spacer that is disposed among the magnetic disks and that includes a through-hole in a center section thereof, a hub inserted into the through-holes of the magnetic disks and the spacer, and a clamp pressing and holding the magnetic disks and the spacer, includes:
measuring a flat surface height of an upper surface of at least one magnetic disk of the magnetic disks that contacts an outer circumference of the spacer or the clamp, and a flat surface height of the upper surface of at least one magnetic disk of the magnetic disks that contacts an inner circumference of the spacer or the clamp; and
inserting the magnetic disks on the hub in an arrangement at which the flat surface height of the upper surface of the at least one magnetic disk of the magnetic disks that contacts the outer circumference of the spacer or the clamp is lower than the flat surface height of the upper surface of the at least one magnetic disk of the magnetic disks that contacts the inner circumference of the spacer.

Advantageous Effects of Invention

According to the present disclosure, a magnetic disk device having excellent impact resistance and high data capacity, and a method for manufacturing the magnetic disk device can be provided.

BRIEF DESCRIPTION OF DRAWINGS

FIG. 1A is a top view illustrating a magnetic disk device according to an embodiment;

FIG. 1B is a side view illustrating the magnetic disk device;

DESCRIPTION OF EMBODIMENTS

In the following, a magnetic disk device (hard disk drive, HDD) and a spacer according to various embodiments of the present disclosure are described while referencing the drawings.

Figure 2:
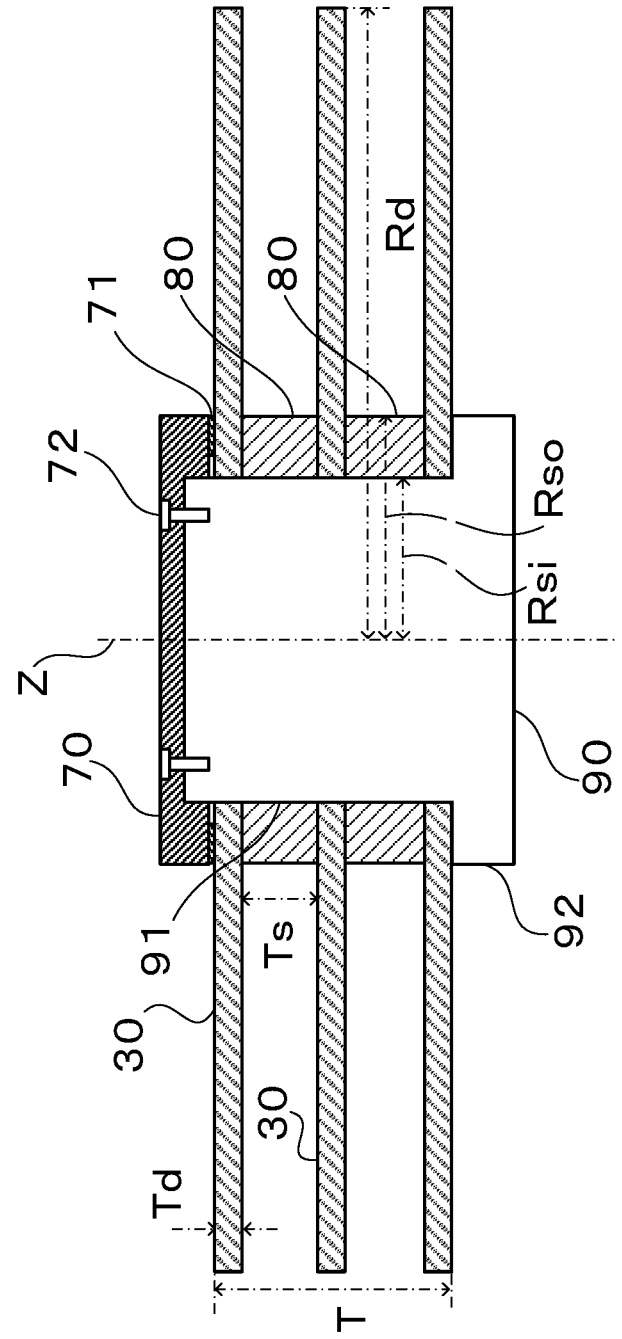
FIG. 2 is a cross-sectional view illustrating magnetic disks and spacers of the magnetic disk device according to the embodiment.

A magnetic disk device 100 of the present embodiment is a box-type recording/playback device and, as illustrated in FIGS. 1A and 1B, includes a housing 10, a base 20, a plurality of magnetic disks 30 that are stacked and disposed, a head stack assembly 40, a voice coil motor 50, a load/unload ramp 60, a clamp 70, and non-illustrated necessary members such as a spindle motor, a circuit board, and the like. Additionally, as illustrated in FIG. 2, the magnetic disk device 100 includes a plurality of spacers 80 disposed among the plurality of magnetic disks 30, and a hub 90 that rotates the plurality of magnetic disks 30 around a rotational axis Z.

Returning to FIG. 1, the dimensions of the magnetic disk device 100 are set by common standards. For example, a 3.5 inch magnetic disk device having dimensions complying with SFF-8301 standards are preferably used in data centers. In these standards, a height H of the housing 10 is set to 26.1 mm, a width W is set to 101.6 mm, and a depth D is set to 147 mm.

The housing 10 is typically made from a metal, and has a cubic box shape in which one face is open. The base 20, the magnetic disks 30, the head stack assembly 40, the voice coil motor 50, the load/unload ramp 60, the clamp 70, and the necessary members such as the spindle motor, the circuit board, and the like are sealed in the housing 10 by a non-illustrated top cover.

The base 20 is disposed on the bottom of the housing 10 and is a portion on which the voice coil motor 50, the spindle motor, the circuit board, and the like are mounted. In many cases, the base 20 and the housing 10 are integrated.

As illustrated in FIG. 2, the magnetic disks 30 are disk-shaped media that are for magnetically recording information and that have a through hole in a center section thereof. Each of the magnetic disks 30 includes a substrate, an underlayer, a magnetic layer, a protective layer, and a lubricant layer. The magnetic disks 30 rotate around the rotational axis Z. Perpendicular magnetic recording (PMR), or shingled magnetic recording (SMR) is preferably used as the magnetic recording method. In order to realize even higher capacity, technologies such as heat assisted magnetic recording (HAMR) and microwave assisted magnetic recording (MAMR) have been developed. An aluminum alloy substrate or a glass substrate is preferably used as the substrate. The aluminum alloy substrate and the glass substrate are described later in detail.

A thickness Td of each of the magnetic disks 30 is preferably from 0.2 mm to 1.75 mm, is more preferably from 0.2 mm to 0.50 mm, is even more preferably from 0.2 mm to 0.48 mm, and is yet even more preferably from 0.2 mm to 0.36 mm. It is preferable that an outer diameter 2×Rd of each of the magnetic disks 30 is 95 mm or 97 mm, and an inner diameter is 25 mm. Additionally, a number N of the magnetic disks 30 of the magnetic disk device 100 of the present embodiment is preferably from 8 to 16. One example for increasing the capacity of the magnetic disk device 100 is the technique of increasing the number of mounted magnetic disks 30 and expanding the data area per each magnetic disk device 100. However, as described above, the dimensions of the magnetic disk device 100 are set by standards, and the space for mounting the magnetic disks 30 is limited. As such, the thickness of each of the magnetic disks 30 is reduced in order to increase the number of mounted magnetic disks 30.

Returning to FIG. 1, the head stack assembly 40 includes an arm 41, and a head 42 attached to a tip of the arm 41. When recording using HAMR, a laser element is mounted on the head 42 and, when recording using MAMR, a microwave generating element is mounted on the head 42.

The voice coil motor 50 is a driving motor that rotates the head stack assembly 40.

The load/unload ramp 60 is a component made from resin. The load/unload ramp 60 is mounted at a position closest to the magnetic disks 30 on the outer circumference side of the magnetic disks 30, and is for retracting the head 42 when the magnetic disk device 100 is not in operation.

As illustrated in FIG. 2, the clamp 70 includes, on a surface opposing an upper surface of the magnetic disks 30, a protrusion 71 that contacts the uppermost magnetic disk 30 of the magnetic disks 30, and presses, holds, and fixes pluralities of magnetic disks 30 and spacers 80 on the hub 90. The magnetic disks 30 are placed in a fixed state by the clamp 70 due to the protrusion 71 of the clamp 70 press-contacting the upper surface of the uppermost magnetic disk 30 of the magnetic disks 30. An inner diameter side portion of the upper surface of the uppermost magnetic disk 30 of the magnetic disks 30 is clamp-fixed by the protrusion 71 and, as such, separation of the magnetic disks 30 when high-speed rotating and processing data is prevented. The clamp 70 is fixed to the hub 90 by a fastening member 72. In one example, a screw, a hexalobed screw having a size of T6 to T8, or the like is used as the fastening member 72. Note that a member having a bolt diameter of M2 or the like is used.

The spacers 80 are ring-shaped thin plates, and are disposed among the plurality of magnetic disks 30. As a result of the spacers 80 being disposed among the magnetic disks 30, the magnetic disks 30 are strongly fixed to the hub 90 of the spindle motor by the clamp 70. The role of the spacers 80 is to secure gaps among the plurality of magnetic disks 30, and to contact and adhere to the magnetic disks 30 to transmit the rotational driving force of the hub 90 to the magnetic disks 30 that do not directly contact the hub 90 or the clamp 70. As such, regarding the shape of the spacers 80, it is desirable that the flatness of both sides of each of the spacers 80 is low.

Regarding the thickness Ts of each of the spacers 80, it is preferable that the gaps among the magnetic disks 30 are narrow because, in such a case, many magnetic disks 30 can be mounted in the limited space. However, space for operating the head stack assembly 40 is needed on the surfaces of the magnetic disks 30. In particular, in the high capacity technologies of HAMR and MAMR described above, when recording using HAMR, a laser element must be mounted on the head 42 and, when recording using MAMR, a microwave generating element must be mounted on the head 42. Consequently, miniaturization of the head stack assembly 40 is not easy. Each of the gaps among the magnetic disks 30, that is, the thickness Ts of each of the spacers 80, must be at least 1 mm or greater, is preferably 1.5 mm or greater, and is more preferably 1.6 mm or greater.

Figure 3:
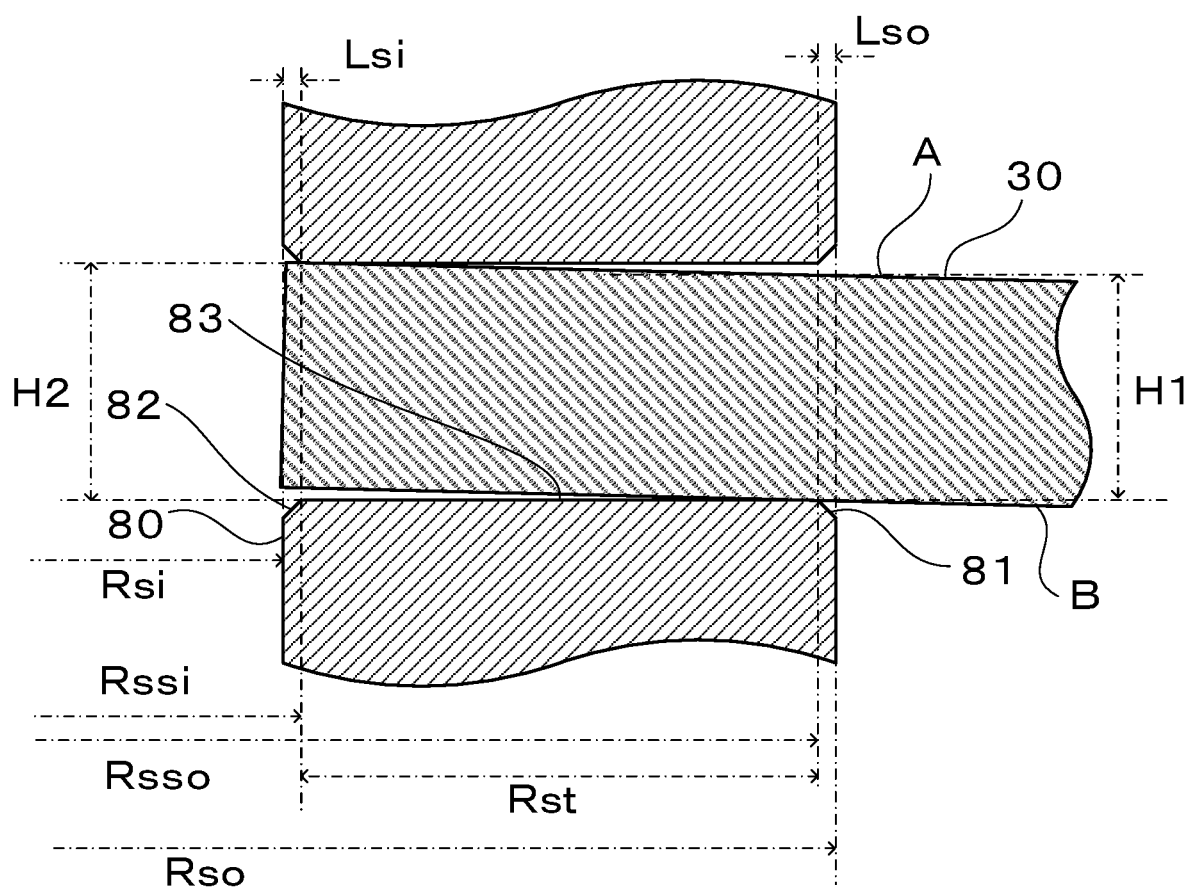
FIG. 3 is an enlarged cross-sectional view illustrating the magnetic disks and the spacers of the magnetic disk device according to the embodiment.

As illustrated in FIG. 3, it is desirable that each of the spacers 80 includes a chamfer 81 for the purpose of deburring on the front and rear surfaces and inner-outer circumference edge surfaces (hereinafter, spacer inner-outer circumferences). This is because, when stacking the magnetic disks 30 and the spacers 80, there is a concern about burrs on the spacer 80 inner-outer circumferences contacting the magnetic disks 30 and causing scratches. When Rso is an outer radius of the spacers 80, Rsi is an inner radius of the spacers 80, Lso is a length of the chamfer 81 of the outer circumference of the spacers 80, Lsi is a length of a chamfer 82 of the inner circumference of the spacers 80, Rsso is an outer radius of a contact section 83 of the spacers 80 and the magnetic disks 30, and Rssi is an inner radius of the contact section 83 of the spacers 80 and the magnetic disks 30, Rsso=Rso−Lso, and Rssi=Rsi+Lsi. A length Rst in the radial direction of the contact section 83 is obtained by Rst=Rsso−Rssi. The contact section 83 is a section where the spacers 80 and the magnetic disks 30 contact. The chamfers 81, 82 of the spacers 80 do not contribute to the contacting of the magnetic disks 30 and do not contribute to the role of transferring the rotational driving force of the hub 90 to the magnetic disks 30. As such, it is preferable that the lengths Lso, Lsi of the chamfers 81, 82 of the spacers 80 be made as small as possible and, specifically, it is preferable that the lengths Lso, Lsi are 0.1 mm or less.

It is desirable that the material forming the spacers 80 is selected from materials that reduce the thermal expansion coefficient difference between the spacers 80 and the magnetic disks 30. When the thermal expansion coefficient difference between the magnetic disks 30 and the spacers 80 is great, misalignments between the spacers 80 and the surfaces of the magnetic disks 30 occur when the environmental temperature changes during operation of the magnetic disk 30 device, and such misalignments cause read/write errors. When the magnetic disks 30 include aluminum alloy substrates, aluminum is preferably used for the spacers 80. When the magnetic disks 30 include glass substrates, glass, stainless steel, titanium, or the like is preferably used for the spacers 80. Furthermore, it is desirable that the spacers 80 are conductive for the purpose of preventing static charge on the magnetic disks 30 and/or the spacers 80. When glass is used for the spacers 80, it is desirable that a metal film such as Ni—P plating or the like is provided on the front and rear surfaces and the side surface of each of the glass spacers 80.

Next, a case is described in which a plurality of the magnetic disks 30 is mounted in the magnetic disk device 100. As illustrated in FIG. 3, Rd is an outer radius of the magnetic disks 30, Td is the thickness of each of the magnetic disks 30, Rso is an outer radius of the spacers 80, Ts is the thickness of each of the spacers 80, and T is a stacked height of the magnetic disks 30 and the spacers 80. The inner diameter of the magnetic disks 30 and the inner diameter of the spacers 80 are equivalent, and an inner radius of the magnetic disks 30 equals an inner radius Rsi of the spacers 80. In one example, the inner diameter of the magnetic disks 30 and an inner diameter 2×Rsi of the spacers 80 are 25 mm. Additionally, an outer diameter 2×Rso of the spacers 80 is preferably from 32 mm to 65 mm. As a result, the data area in the magnetic disk device 100 can be expanded while maintaining the impact resistance and the fluttering resistance of the magnetic disk device 100.

Here, a magnetic disk device 100 is considered in which the height H of the housing 10, which is compliant with SFF-8301, is 26.1 mm. When N of the magnetic disks 30, each having the thickness Td, and (N−1) of the spacers 80, each having the thickness Ts are alternately stacked in the magnetic disk device 100, the stacked height T thereof, namely T=N×Td+(N−1)×Ts, must be lower than 26.1 mm. However, in addition to the magnetic disks 30 and the spacers 80, other components such as the base 20, the circuit board, the spindle motor. the clamp 70, the hub 90, the top cover, and the like are also mounted in the space inside the magnetic disk device 100. As such, the stacked height T of the magnetic disks 30 and the spacers 80 is preferably 20 mm or less, and is more preferably 19 mm or less. As described above, a lower limit value of the thickness Td of each of the magnetic disks 30 is 0.3 mm, a lower limit value of the thickness Ts of each of the spacers 80 is 1 mm, and an upper limit value of the stacked height T of the magnetic disks 30 and the spacers 80 is 20 mm. As such, an upper limit value of the number N of magnetic disks 30 is 16. Additionally, in order to realize high capacity of the magnetic disk device 100, the number N of the magnetic disks 30 is preferably 8 or greater.

The hub 90 is formed from a metal, such as an aluminum alloy or the like, that is not a ferromagnetic material, has a shape in which a small diameter section 91 and a large diameter section 92, which have cylindrical shapes, are connected in the direction of the rotational axis Z, and is rotated by the spindle motor with the rotational axis Z as a center axis. A diameter of the small diameter section 91 is the same as the inner diameter of the magnetic disks 30 and the inner diameter 2Rsi of the spacers 80. The large diameter section 92 and the clamp 70 sandwich and fix the magnetic disks 30 and the spacers 80.

As described above, the magnetic disks 30 are disk-shaped media for magnetically recording information, and each include a substrate, an underlayer, a magnetic layer, a protective layer, and a lubricant layer. An aluminum alloy substrate or a glass substrate is preferably used as the substrate.

Aluminum Alloy Substrate

A conventionally used Al—Mg alloy such as JIS5086 alloy or the like, which has high strength, is preferably used for the aluminum alloy substrate. Alternatively, an Al—Fe alloy, which has high rigidity, is preferably used for the aluminum alloy substrate.

Specifically, the Al—Mg alloy is an aluminum alloy that contains from 1.0 to 6.5 mass % of Mg; further contains one or two or more of 0.070 mass % or less of Cu, 0.60 mass % or less of Zn, 0.50 mass % or less of Fe, 0.50 mass % or less of Si, 0.20 mass % or less of Cr, 0.50 mass % or less of Mn, and 0.20 mass % or less of Zr; and in which the balance consists of aluminum, unavoidable impurities, and other trace elements. Examples of the other trace elements include Be, Sr, and the like and, provided that the content of each trace element is 0.1 mass % or less, these trace elements do not inhibit the effects of the present disclosure.

The Al—Fe alloy is an aluminum alloy that contains Fe, which is a required element, and one or two of Mn and Ni, which are selective elements, the sum of the contents of the Fe, Mn, and Ni having a relationship of from 1.00 to 7.00 mass %; further contains one or two or more of 14.0 mass % or less of Si, 0.7 mass % or less of Zn, 1.0 mass % or less of Cu, 3.5 mass % or less of Mg, 0.30 mass % or less of Cr, and 0.20 mass % or less Zr; and in which the balance consists of aluminum, unavoidable impurities, and other trace elements. Examples of the other trace elements include Be, Sr, and the like and, provided that the content of each trace element is 0.1 mass % or less, these trace elements do not inhibit the effects of the present disclosure.

Next, a method for manufacturing the aluminum alloy substrate is described.

Firstly, an ingot is fabricated by a semi-continuous casting method, and the fabricated ingot is hot rolled and cold rolled to fabricate a plate material of a desired thickness. Alternatively, a plate material is fabricated by continuous casting, and the fabricated plate material is cold rolled to fabricate a plate material of a desired thickness. The ingot may be subjected to a heat treatment for the purpose of homogenizing the structure. The plate material may be subjected to a heat treatment prior to the cold rolling, during the cold rolling, and after the cold rolling for the purpose of improving workability and the like.

Next, the plate material fabricated as described above is punched using a press machine, and disk-shaped blanks having desired inner diameter and outer diameter dimensions are fabricated. Then, the blanks are stacked, a load is applied to the stacked blanks, and heat treatment is performed for the purpose of reducing the flatness of the blanks.

Next, the inner diameter section and the outer diameter section of each of the blanks are turned on a lathe, and T-subs having desired inner diameter and outer diameter dimensions and a chamfer of a desired length are fabricated. Furthermore, the surfaces of both sides of each of the blanks may be ground and T-subs having a desired thickness may be fabricated. Furthermore, the T-subs may be subjected to a heat treatment for the purpose of eliminating the machining distortion generated in the material due to the grinding.

Next, the surfaces of both sides of each of the T-subs are ground using a grinding machine, and G-subs of a determined thickness are fabricated. Furthermore, the G-subs may be subjected to a heat treatment for the purpose of eliminating the machining distortion generated in the material due to the grinding.

Next, M-subs are fabricated by forming a plating of a desired thickness on all surfaces, including the front surface, the side surface, and the chamfer surface, of the G-subs. Firstly, the G-subs are subjected to pre-processing for the purpose of enhancing plating adhesion. Next, plating is performed. Ni—P electroless plating is preferably used as the plating. Furthermore, the M-subs may be subjected to a heat treatment for the purpose of eliminating the internal stress of the Ni—P electroless plating.

Next, the surfaces of both sides of each of the M-subs are polished using a polishing machine, and substrates, that is, aluminum alloy substrates, of a desired thickness are fabricated. The lower limit value of the thickness of the each of the aluminum alloy substrates fabricated by this method is 0.3 mm. This lower limit value is due to the thickness of a component called a carrier that holds the aluminum alloy substrate when polishing on the polishing machine. The thickness of the carrier can be selected as desired provided that it is greater than or equal to the thickness of each workpiece, namely the aluminum alloy substrate. However, when the carrier is excessively thin, strength is insufficient and the carrier breaks during polishing. From the perspective of the strength of the carrier, the thickness of the carrier is preferably 0.3 mm or greater. Therefore, the lower limit value of the thickness of each workpiece, namely the aluminum alloy substrate, is 0.3 mm. Note that a carrier made from a resin such as aramid resin, epoxy resin, or the like is preferably used as the carrier. The carrier may include a fibrous reinforcing material such as carbon fiber, glass fiber, or the like for the purpose of enhancing strength.

Next, the underlayer, the magnetic layer, the protective layer, and the lubricant layer are formed on a surface of each of the aluminum alloy substrates. Thus, the magnetic disks 30 are obtained.

Glass Substrate

An aluminosilicate glass, which has high hardness, is preferably used for the glass substrate. Specifically, the aluminosilicate glass contains from 55 to 70 mass % of $SiO_2$ as a main component; one or two or more of 25 mass % or less of $Al_2O_3$, 12 mass % or less of $Li_2O$, 12 mass % or less of $Na_2$, 8 mass % or less of $K_2O$, 7 mass % or less of MgO, 10 mass % or less of CaO, 10 mass % or less of $ZrO_2$, and 1 mass % or less of $TiO_2$; and the balance consists of unavoidable impurities and other trace elements.

Next, a method for manufacturing the glass substrate is described.

Firstly, a glass material prepared in a predetermined chemical composition is dissolved, and a direct press method is used to press-mold the molten ingot from both sides to fabricate glass base plates having a desired thickness. The method used to fabricate the glass base plates is not limited to the direct press method, and a float method, a fusion method, a redraw method, or the like may be used.

Next, the glass base plates are cored in an annular shape, and the inner diameter section and the outer diameter section are polished. Thus, annular glass plates having desired inner diameter and outer diameter dimensions and a desired chamfer length are obtained.

Next, the surfaces of both sides of each of the annular glass plates are ground using a grinding machine, and annular glass substrates having a desired thickness and flatness are obtained.

Furthermore, the surfaces of both sides of each of the annular glass substrates are polished using a polishing machine, and substrates, that is, glass substrates, of a desired thickness are fabricated. During the polishing, a chemical strengthening treatment using a sodium nitrate solution, a potassium nitrate solution, or the like may be carried out.

The lower limit value of the thickness of each of the glass substrates fabricated by this method is 0.3 mm. This lower limit value is due to the thickness of a component called a carrier that holds the glass substrate when polishing on the polishing machine. The thickness of the carrier can be selected as desired provided that it is greater than or equal to the thickness of each workpiece, namely the glass substrate. However, when the carrier is excessively thin, strength is insufficient and the carrier breaks during polishing. From the perspective of the strength of the carrier, the thickness of the carrier is preferably 0.3 mm or greater. Therefore, the lower limit value of the thickness of each workpiece, namely the glass substrate, is 0.3 mm. Note that a carrier made from a resin such as aramid resin, epoxy resin, or the like is preferably used as the carrier. The carrier may include a fibrous reinforcing material such as carbon fiber, glass fiber, or the like for the purpose of enhancing strength.

Impact Resistance

Figure 4:
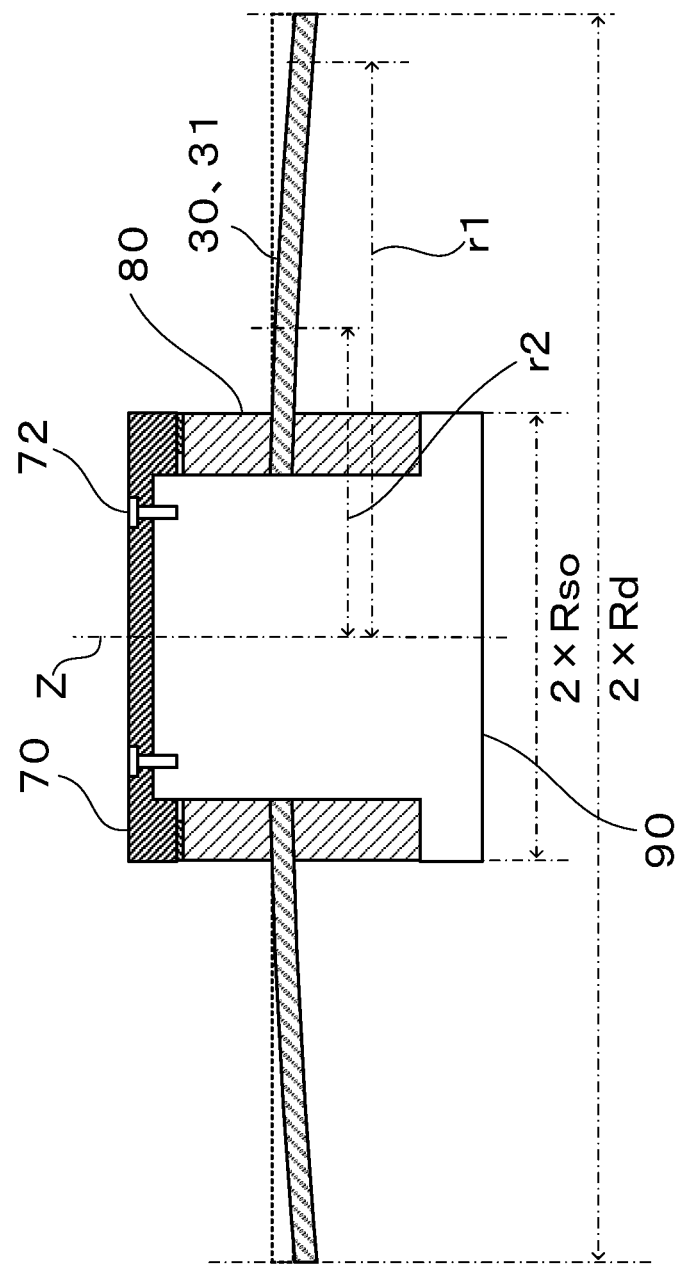
FIG. 4 is a drawing illustrating a case in which an impact is applied to a magnetic disk of the magnetic disk device according to the embodiment.

When the magnetic disk device 100 is subjected to an impact from outside, as illustrated in FIG. 4, the magnetic disks 30 flex, and the magnetic disks 30 collide with the load/unload ramp 60, for example. As described above, the load/unload ramp 60 is a resin component that is mounted at a position closest to the magnetic disks 30 on the outer circumference side of the magnetic disks 30, and is for the purpose of retracting the head 42 when the magnetic disk device 100 is not in operation. When the magnetic disks 30 collide with the load/unload ramp 60, a portion of the load/unload ramp 60 chips off, thus producing foreign matter, scratching the magnetic disks 30, and the like, which causes failures. As the rigidity of the magnetic disks 30 increases, the amount of flexing decreases and the probability of failure decreases. That is, as the rigidity of the magnetic disks 30 increases, the impact resistance increases.

Fluttering Resistance

During operation of the magnetic disk device 100, the magnetic disks 30 rotate at high speed. In one example, the rotation speed is 7200 RPM. When the magnetic disks 30 rotate at high speed, a turbulent flow is generated in the gas inside the device including the magnetic disks 30, and the magnetic disks 30 vibrate. This vibration phenomenon is called fluttering. When the magnetic disks 30 vibrate, the position accuracy of the head 42 decreases, which causes read errors. As the rigidity of the magnetic disks 30 increases, the amount of vibration decreases, and the probability of read/write errors decreases. That is, as the rigidity of the magnetic disks 30 increases, the fluttering resistance increases. Note that a technique is known for filling the inside of the magnetic disk device 100 with helium instead of air for the purpose of reducing the turbulent flow of gas inside the magnetic disk device 100.

Rigidity of Magnetic Disks

The impact resistance of the magnetic disks 30 is expressed by the magnitude of the amount of flex of the magnetic disks 30 when the magnetic disks 30 are subjected to acceleration caused by impact. The fluttering resistance of the magnetic disks 30 is expressed by the magnitude of the amount of flex of the magnetic disks 30 when the magnetic disks 30 are subjected to the turbulent flow of gas generated by the high speed rotation of the magnetic disks 30. That is, the impact resistance and the fluttering resistance of the magnetic disks 30 are determined by whether the magnetic disks 30 easily flex.

Flat Surface Height of Magnetic Disks

At surfaces where the magnetic disks 30 and the spacers 80 contact, as illustrated in FIG. 3, a flat surface height H1 of an upper surface of the magnetic disk 30 that contacts the outer circumference of the spacer 80 is lower than a flat surface height H2 of the upper surface of the magnetic disk 30 that contacts the inner circumference of the spacer 80. In one example, the flat surface height H1 and the flat surface height H2 are measured with the contact section 83 as a reference. With the magnetic disk 30 disposed uppermost, at the surfaces where the magnetic disk 30 and the clamp 70 contact, the flat surface height H1 of the upper surface of the magnetic disk 30 that contacts the outer circumference of the clamp 70 is lower than the flat surface height H2 of the upper surface of the magnetic disk 30 that contacts the inner circumference of the clamp 70. The upper surface of the magnetic disk 30 is referred to as a surface near the clamp 70. It is preferable that, for at least the magnetic disk 30 disposed uppermost, the flat surface height H1 is lower than the flat surface height H2 at the surfaces where the magnetic disk 30 and the clamp 70 contact. It is more preferable that, for a number of the magnetic disks 30 greater than one-half of the total number of the mounted magnetic disks 30, the flat surface height H1 is less than the flat surface height H2 at the surfaces where the magnetic disks 30 and the spacers 80 contact. It is even more preferable that, for all of the magnetic disks 30, the flat surface height H1 is less than the flat surface height H2 at the surfaces where the magnetic disks 30 and the spacers 80 contact. When the flat surface height H1 and the flat surface height H2 of the upper surfaces of the magnetic disks 30 are defined as described above, the impact resistance can be enhanced. When the flat surface height H1 of the magnetic disk 30 that contacts the outer circumference of the spacer 80 is greater than the flat surface height H2 of the magnetic disk 30 that contacts the inner circumference of the spacer 80, when fastening, the gap on the outer circumference between the spacer 80 and the lower surface of the magnetic disk 30 becomes larger. In this state, when an impact, directed upward, from outside is applied to the magnetic disk device 100, the magnetic disks 30 deform greatly and, consequently, impact resistance decreases. Meanwhile, when the flat surface height H1 of the magnetic disk 30 that contacts the outer circumference of the spacer 80 is less than the flat surface height H2 of the magnetic disk 30 that contacts the inner circumference of the spacer 80, when fastening, the gap on the outer circumference between the spacer 80 and the lower surface of the magnetic disk 30 becomes smaller. In this state, when an impact, directed upward, from outside is applied to the magnetic disk device 100, the gaps are small and, as such, the magnetic disks 30 immediately contact the spacers 80, an effect of preventing the magnetic disks 30 from deforming greatly is exhibited, and the impact resistance is enhanced. Note that, in cases in which the magnetic disk device 100 is dropped with the upper surface facing upward or the like, an upward-directed impact is applied to the magnetic disk device 100 from outside. As such, it is though that the probability of an upward-directed impact being applied to the magnetic disk device 100 from outside is greater than the probability of a downward-directed impact being applied from the outside. Accordingly, excellent impact resistance can be obtained due to the flat surface height H1 of each of the magnetic disks 30 being less than the flat surface height H2. A difference (H1−H2) between the flat surface height H1 of the magnetic disk 30 that contacts the outer circumference of the spacer 80 and the flat surface height H2 of the magnetic disk 30 that contacts the inner circumference of the spacer 80 is preferably −3.0 μm or less, and is more preferably −4.0 μm or less. Note that, while not particularly provided, a lower limit value of this difference is about −15 μm.

Method for Manufacturing Magnetic Disk Device

A method for manufacturing the magnetic disk device 100 includes a step of measuring the flat surface height H1 of the upper surface of the magnetic disk 30 that contacts the outer circumference of the spacer 80 and the flat surface height H2 of the magnetic disk 30 that contacts the inner circumference of the spacer 80, a step of inserting the magnetic disks 30 and the spacers 80 on the hub 90 in an arrangement in which the surface height H1 of the upper surface of the magnetic disk 30 that contacts the outer circumference of the spacer 80 is less than the flat surface height H2 of the magnetic disk 30 that contacts the inner circumference of the spacer 80, and a step of fixing the magnetic disks 30 and the spacers 80 to the hub 90 by the clamp 70.

The step of measuring the flat surface heights H1, H2 is carried out as follows. Note that the flat surface heights H1, H2 are expressed by a peak height and a valley depth of the entire surface of each of the magnetic disks 30, relative to a certain reference surface (0 μm), In FIG. 3, the spacer 80 disposed below is illustrated as the certain reference surface. The flat surface height H1 of the magnetic disk 30 that contacts the outer circumference of the spacer 80 is obtained by measuring the flat surface height of the entire substrate, then measuring a height difference in the circumferential direction at the position of the magnetic disk 30 (for example, the position of the outer radius Rsso) that contacts the outer circumference of the spacer 80, and calculating a maximum peak height or a maximum valley depth. The flat surface height H2 of the magnetic disk 30 that contacts the inner circumference of the spacer 80 is obtained by measuring the flat surface height of the entire substrate, then measuring a height difference in the circumferential direction at the position of the magnetic disk 30 (for example, the position of the inner radius Rssi) that contacts the inner circumference of the spacer 80, and calculating the maximum peak height or the maximum valley depth. Here, the maximum peak height is the greatest value of the outer circumference or the inner circumference, and the maximum valley depth is the lowest value of the outer circumference or the inner circumference. When the maximum peak height of the inner circumference is greater than the maximum valley depth of the outer circumference, the difference between H1 (maximum valley depth) and H2 (maximum peak height) is expressed by H1−H2 and, when that value is less than 0 μm, the flat surface height H1 of the magnetic disk 30 that contacts the outer circumference of the spacer 80 is defined as being less than the flat surface height H2 of the magnetic disk 30 that contacts the inner circumference of the spacer 80. When the maximum peak height of the outer circumference is greater than the maximum valley depth of the inner circumference, the difference between H1 (maximum peak height) and H2 (maximum valley depth) is expressed by H1−H2, and the flat surface height H1 of the magnetic disk 30 that contacts the outer circumference of the spacer 80 is defined as being greater than the flat surface height H2 of the magnetic disk 30 that contacts the inner circumference of the spacer 80. When the flat surface height H1 is greater than the flat surface height H2, the thickness of each of the magnetic disks 30 is constant and, as such, when flipped over and measured, the flat surface height H1 is less than the flat surface height H2.

Next, the step of inserting the magnetic disks 30 and the spacers 80 on the hub 90 is described. In the step of measuring the flat surface heights H1, H2, when the measured flat surface height H1 is less than the flat surface height H2, the magnetic disks 30 are inserted on the hub 90 in that state without modification. When the measured flat surface height H1 is greater than the flat surface height H2, the magnetic disks 30 are flipped over and, then, the magnetic disks 30 are inserted on the hub 90. Thereafter, the magnetic disks 30 and the spacers 80 are fixed to the hub 90 by the clamp 70.

Thus, according to the magnetic disk device 100 of the present embodiment, the flat surface height H1 of the upper surface of at least one magnetic disk of the magnetic disks 30 that contacts the outer circumference of each of the spacers 80 is less than the flat surface height H2 of the upper surface of at least one magnetic disk of the magnetic disks 30 that contacts the inner circumference of each of the spacers 80 and, as a result, a 3.5 inch magnetic disk device can be provided whereby impact resistance can be enhanced without reducing the recording area, and that has excellent impact resistance and high data capacity. By installing the magnetic disk device 100 in a data center, the capacity of the data center can be increased. Additionally the concept of the present embodiment of the flat surface height H1 of the upper surface of at least one magnetic disk of the magnetic disks 30 that contacts the outer circumference of each of the spacers 80 being less than the flat surface height H2 of the upper surface of at least one magnetic disk of the magnetic disks 30 that contacts the inner circumference of each of the spacers 80 is not limited to the 3.5 inch magnetic disk device 100, but can be applied to magnetic disk devices 100 of all sizes. The type of the magnetic disks 30 is not limited to the magnetic disks 30 formed from the aluminum alloy substrate and the glass substrate, and any type of magnetic disks 30 can be used.

MODIFIED EXAMPLES

In the embodiments described above, an example is described in which the magnetic disk device 100 is a 3.5 inch magnetic disk device. However, the magnetic disk device 100 may be a device other than a 3.5 inch device. For example, the magnetic disk device 100 may be a 2.5 inch magnetic disk device.

EXAMPLES

In the following, the present disclosure is described in further detail using examples, but the present disclosure is not limited to these examples.

Example 1 aluminum alloy substrates having the compositions illustrated in Table 1 and glass substrates having the compositions illustrated in Table 2 were fabricated as magnetic disk substrates 31. The size of the magnetic disk substrate 31 was an inner diameter of 25 mm, an outer diameter of 97 mm, and a thickness of 0.50 mm. The difference (H1−H2) between the flat surface height H1 of each of the magnetic disk substrates 31 that contacts the outer circumference of each of the spacers 80 and the flat surface height H2 of each of the magnetic disk substrates 31 that contacts the inner circumference of the each of the spacers 80 is illustrated in Table 1 for Examples 1 to 8 and Comparative Examples 1 to 8, and in Table 2 for Examples 9 and 10 and Comparative Examples 9 and 10. The measuring of H1 and H2 in Examples 1 to 10 was carried out on the front surface (surface A) as illustrated in FIG. 3. The measuring of H1 was performed under the condition of the outer radius Rsso of the contact section of the spacer 80 and the magnetic disk substrate 31 being 15.8 (tolerance: +0, −0.5 mm). The measuring of H2 was performed under the condition of the inner radius Rssi of the contact section of the spacer 80 and the magnetic disk substrate 31 being 12.7 (tolerance: +0.5, −0 mm). The measuring of the flat surface heights H1 and H2 was performed using a non-contact flatness measuring machine (MESA) (manufactured by ZyGO).

TABLE 1

Table 1

| No. | ALLOY COMPOSITION (MASS %) | | | | | | | | | | |
|---|---|---|---|---|---|---|---|---|---|---|---|
| | Fe | Mn | Ni | Mg | Zn | Cu | Cr | Zr | Be | Si | Al + UNAVOIDABLE IMPURITIES |
| EXAMPLE 1 | 0.02 | 0.00 | 0.00 | 4.00 | 0.31 | 0.02 | 0.05 | 0.00 | 0.0002 | 0.02 | BALANCE |
| EXAMPLE 2 | 0.02 | 0.00 | 0.00 | 4.00 | 0.31 | 0.02 | 0.05 | 0.00 | 0.0002 | 0.02 | BALANCE |
| EXAMPLE 3 | 0.02 | 0.00 | 0.00 | 4.00 | 0.31 | 0.02 | 0.05 | 0.00 | 0.0002 | 0.02 | BALANCE |
| EXAMPLE 4 | 0.02 | 0.00 | 0.00 | 4.00 | 0.31 | 0.02 | 0.05 | 0.00 | 0.0002 | 0.02 | BALANCE |
| EXAMPLE 5 | 0.64 | 0.33 | 1.74 | 1.51 | 0.33 | 0.02 | 0.00 | 0.01 | 0.0000 | 0.06 | BALANCE |
| EXAMPLE 6 | 0.64 | 0.33 | 1.74 | 1.51 | 0.33 | 0.02 | 0.00 | 0.01 | 0.0000 | 0.06 | BALANCE |

TABLE 1-continued

Table 1

| | | | | | | | | | | | |
|---|---|---|---|---|---|---|---|---|---|---|---|
| EXAMPLE 7 | 0.64 | 0.33 | 1.74 | 1.51 | 0.33 | 0.02 | 0.00 | 0.01 | 0.0000 | 0.06 | BALANCE |
| EXAMPLE 8 | 0.64 | 0.33 | 1.74 | 1.51 | 0.33 | 0.02 | 0.00 | 0.01 | 0.0000 | 0.06 | BALANCE |
| COMPARATIVE EXAMPLE 1 | 0.02 | 0.00 | 0.00 | 4.00 | 0.31 | 0.02 | 0.05 | 0.00 | 0.0002 | 0.02 | BALANCE |
| COMPARATIVE EXAMPLE 2 | 0.02 | 0.00 | 0.00 | 4.00 | 0.31 | 0.02 | 0.05 | 0.00 | 0.0002 | 0.02 | BALANCE |
| COMPARATIVE EXAMPLE 3 | 0.02 | 0.00 | 0.00 | 4.00 | 0.31 | 0.02 | 0.05 | 0.00 | 0.0002 | 0.02 | BALANCE |
| COMPARATIVE EXAMPLE 4 | 0.02 | 0.00 | 0.00 | 4.00 | 0.31 | 0.02 | 0.05 | 0.00 | 0.0002 | 0.02 | BALANCE |
| COMPARATIVE EXAMPLE 5 | 0.64 | 0.33 | 1.74 | 1.51 | 0.33 | 0.02 | 0.00 | 0.01 | 0.0000 | 0.06 | BALANCE |
| COMPARATIVE EXAMPLE 6 | 0.64 | 0.33 | 1.74 | 1.51 | 0.33 | 0.02 | 0.00 | 0.01 | 0.0000 | 0.06 | BALANCE |
| COMPARATIVE EXAMPLE 7 | 0.64 | 0.33 | 1.74 | 1.51 | 0.33 | 0.02 | 0.00 | 0.01 | 0.0000 | 0.06 | BALANCE |
| COMPARATIVE EXAMPLE 8 | 0.64 | 0.33 | 1.74 | 1.51 | 0.33 | 0.02 | 0.00 | 0.01 | 0.0000 | 0.06 | BALANCE |

| No. | SINGLE SIDED PLATING THICKNESS (μm) | DIFFERENCE BETWEEN FLAT SURFACE HEIGHT H1 OF MAGNETIC DISK CONTACTING OUTER CIRCUMFERENCE AND FLAT SURFACE HEIGHT H2 OF MAGNETIC DISK CONTACTING INNER CIRCUMFERENCE (H1 − H2) (μm) | RELATIVE VALUE OF MAXIMUM AMOUNT OF FLEX (%) |
|---|---|---|---|
| EXAMPLE 1 | 10 | −10.2 | 97.6 |
| EXAMPLE 2 | 20 | −8.7 | 92.5 |
| EXAMPLE 3 | 10 | −2.8 | 98.9 |
| EXAMPLE 4 | 20 | −2.2 | 99.9 |
| EXAMPLE 5 | 10 | −6.5 | 96.1 |
| EXAMPLE 6 | 20 | −4.1 | 94.1 |
| EXAMPLE 7 | 10 | −1.0 | 98.4 |
| EXAMPLE 8 | 20 | −2.4 | 99.0 |
| COMPARATIVE EXAMPLE 1 | 10 | 10.1 | 102.5 |
| COMPARATIVE EXAMPLE 2 | 20 | 9.0 | 108.2 |
| COMPARATIVE EXAMPLE 3 | 10 | 2.7 | 101.1 |
| COMPARATIVE EXAMPLE 4 | 20 | 2.3 | 100.1 |
| COMPARATIVE EXAMPLE 5 | 10 | 6.7 | 104.1 |
| COMPARATIVE EXAMPLE 6 | 20 | 4.6 | 106.3 |
| COMPARATIVE EXAMPLE 7 | 10 | 1.3 | 101.6 |
| COMPARATIVE EXAMPLE 8 | 20 | 2.7 | 101.0 |

TABLE 2

Table 2

| | CHEMICAL COMPOSITION (MASS %) | | | | | | | | | |
|---|---|---|---|---|---|---|---|---|---|---|
| No. | $SiO_2$ | $Al_2O_3$ | $ZrO_2$ | $Na_2O$ | $K_2O$ | MgO | CaO | $TiO_2$ | $Li_2O$ | TRACE ELEMENTS AND UNAVOIDABLE IMPURITIES |
| EXAMPLE 9 | 63.0-69.0 | 12.0-18.0 | 0.0-0.5 | 9.0-11.0 | 0.1-0.5 | 0.5-1.5 | 1.0-3.0 | 0.0-0.5 | 3.0-5.0 | BALANCE |
| EXAMPLE 10 | 52.0-58.0 | 21.0-27.0 | 0.0-0.5 | 0.5-1.5 | 0.0-0.5 | 5.0-7.0 | 7.0-10.0 | 0.5-1.5 | 1.0-3.0 | BALANCE |
| COMPARATIVE EXAMPLE 9 | 63.0-69.0 | 12.0-18.0 | 0.0-0.5 | 9.0-11.0 | 0.1-0.5 | 0.5-1.5 | 1.0-3.0 | 0.0-0.5 | 3.0-5.0 | BALANCE |
| COMPARATIVE EXAMPLE 10 | 52.0-58.0 | 21.0-27.0 | 0.0-0.5 | 0.5-1.5 | 0.0-0.5 | 5.0-7.0 | 7.0-10.0 | 0.5-1.5 | 1.0-3.0 | BALANCE |

TABLE 2-continued

Table 2

| No. | DIFFERENCE BETWEEN FLAT SURFACE HEIGHT H1 OF MAGNETIC DISK CONTACTING OUTER CIRCUMFERENCE AND FLAT SURFACE HEIGHT H2 OF MAGNETIC DISK CONTACTING INNER CIRCUMFERENCE (H1 − H2) (μm) | RELATIVE VALUE OF MAXIMUM AMOUNT OF FLEX (%) |
|---|---|---|
| EXAMPLE 9 | −3.1 | 97.7 |
| EXAMPLE 10 | −1.5 | 99.6 |
| COMPARATIVE EXAMPLE 9 | 3.1 | 102.4 |
| COMPARATIVE EXAMPLE 10 | 1.4 | 100.4 |

Next, as illustrated in FIG. 4, the magnetic disk substrate 31 was fixed to the hub 90 by the spacers 80 and the clamp 70 with the surface A of the magnetic disk substrate 31 facing upward (the side in the Z-direction closer to the clamp 70 illustrated in FIG. 2 is upward), and the amount of flex caused by impact of an outer circumferential position (a distance r1 from a substrate center: 44.2 mm) of the magnetic disk substrate 31 and an inner circumferential position (a distance r2 from the substrate center: 23 mm) of the magnetic disk substrate 31 was measured by a capacitive distance sensor by applying an upward-directed impact at an acceleration of 55 to 60 G and an action time of 2.7 to 3.0 ms. Aluminum spacers having an outer diameter of 32 mm, an inner diameter of 25 mm, and a thickness of 1.7 mm were used for the spacers 80.

The amounts of flex, caused by the impact, at the outer circumferential position and the inner circumferential position of the magnetic disk substrate 31 were measured, a difference between the amounts of flex at the outer circumferential position and the inner circumferential position ([outer circumference amount of flex]−[inner circumference amount of flex]) was calculated, and a value obtained by dividing the maximum value of the absolute value by the acceleration ([maximum value of absolute value of difference between amounts of flex]/[acceleration], hereinafter referred to as "maximum amount of flex") was calculated.

Example 1 is a case in which the measuring was performed with the surface A facing upward, and Comparative Example 1 is a case that is the same as Example 1 except that a rear surface, namely a surface B, of the magnetic disk substrate 31 was facing upward. Example 1 and Comparative Example 1 were each measured three times. Comparative Examples 2 to 10 are cases that are respectively the same as Examples 2 to 10 except that the measuring was performed with the rear surface, namely the surface B, of the magnetic disk substrate 31 facing upward. Likewise, Examples 2 to 10 and Comparative Examples 2 to 10 were each measured three times. Then, an average value of the amounts of flex of the six instances of Example 1 and Comparative Example 1 were calculated and, with this average value as 100%, an average value of a relative value of the maximum amount of flex of Example 1 measured three times, and an average value of a relative value of the maximum amount of flex of Comparative Example 1 measured three times were calculated. For Examples 2 to 10 as well, with the maximum amount of flex of the average value of each of Examples 2 to 10 and Comparative Examples 2 to 10 as 100%, the relative value of the maximum amount of flex of Examples 2 to 10 and the relative value of the maximum amount of flex of Comparative Examples 2 to 10 were calculated. Note that, when the maximum amount of flex of the magnetic disk substrate 31 caused by the impact is great, the components in the magnetic disk device collide with the load/unload ramp, for example, and a portion of the load/unload ramp chips off, thus producing foreign matter, scratching the magnetic disks, and the like, which causes failures. The impact resistance increases as the maximum amount of flex of the substrate decreases.

Example 2

Aluminum alloy substrates having the composition illustrated in Example 1 of Table 1 and different thicknesses were fabricated as the magnetic disk substrate 31. The size of the magnetic disk substrate 31 was an inner diameter of 25 mm, an outer diameter of 97 mm, and a thickness of 0.35 mm. The difference (H1−H2), of the magnetic disk substrate 31, between the flat surface height H1 of the magnetic disk substrate 31 that contacts the outer circumference of the spacer 80 and the flat surface height H2 of the magnetic disk substrate 31 that contacts the inner circumference of the spacer 80 is illustrated in Table 3 for Example 11 and Comparative Example 11. The measuring of H1 and H2 was performed in the same manner as in Example 1 described above.

TABLE 3

Table 3

| | ALLOY COMPOSITION (MASS %) | | | | | | | | | | |
|---|---|---|---|---|---|---|---|---|---|---|---|
| No. | Fe | Mn | Ni | Mg | Zn | Cu | Cr | Zr | Be | Si | Al + UNAVOIDABLE IMPURITIES |
| EXAMPLE 11 | 0.02 | 0.00 | 0.00 | 4.00 | 0.31 | 0.02 | 0.05 | 0.00 | 0.0002 | 0.02 | BALANCE |
| COMPARATIVE EXAMPLE 11 | 0.02 | 0.00 | 0.00 | 4.00 | 0.31 | 0.02 | 0.05 | 0.00 | 0.0002 | 0.02 | BALANCE |

TABLE 3-continued

Table 3

| No. | DIFFERENCE BETWEEN FLAT SURFACE HEIGHT H1 OF MAGNETIC DISK CONTACTING OUTER CIRCUMFERENCE AND FLAT SURFACE HEIGHT H2 OF MAGNETIC DISK CONTACTING INNER CIRCUMFERENCE (H1 − H2) (μm) | RELATIVE VALUE OF MAXIMUM AMOUNT OF FLEX (%) |
|---|---|---|
| EXAMPLE 11 | −0.03 | 98.3 |
| COMPARATIVE EXAMPLE 11 | 0.5 | 101.7 |

Next, as illustrated in FIG. 4, the magnetic disk substrate 31 was fixed to the hub 90 by the spacers 80 and the clamp 70 with the surface A of the magnetic disk substrate 31 facing upward (the side in the Z-direction closer to the clamp 70 illustrated in FIG. 2 is upward), and the amount of flex caused by impact of an outer circumferential position (the distance r1 from the substrate center: 44.2 mm) of the magnetic disk substrate 31 and an inner circumferential position (the distance r2 from the substrate center: 23 mm) of the magnetic disk substrate 31 was measured by a capacitive distance sensor by applying an upward-directed impact at an acceleration of 31 to 33 G and an action time of 3.6 to 3.85 ms. Aluminum spacers having an outer diameter of 32 mm, an inner diameter of 25 mm, and a thickness of 1.7 mm were used for the spacers 80.

The amounts of flex, caused by the impact, at the outer circumferential position and the inner circumferential position of the magnetic disk substrate 31 were measured, the difference between the amounts of flex at the outer circumferential position and the inner circumferential position ([outer circumference amount of flex]−[inner circumference amount of flex]) was calculated, and the value obtained by dividing the maximum value of the absolute value by the acceleration ([maximum value of absolute value of difference between amounts of flex]/[acceleration], hereinafter referred to as "maximum amount of flex") was calculated.

Example 11 is a case in which the measuring was performed with the surface A facing upward, and Comparative Example 11 is a case that is the same as Example 11 except that the rear surface, namely the surface B, of the magnetic disk substrate 31 was facing upward. Example 11 and Comparative Example 11 were each measured three times. Comparative Example 11 is a case that is the same as Example 11 except that the measuring was performed with the rear surface, namely the surface B, of the magnetic disk substrate 31 facing upward. Then, the average value of Example 11 and Comparative Example 11 was calculated and, with the maximum amount of flex of the average value of Example 11 and Comparative Example 11 as 100%, the relative value of the maximum amount of flex of Example 11 and Comparative Example 11 was calculated. Note that, when the maximum amount of flex of the magnetic disk substrate 31 caused by the impact is great, the components in the magnetic disk device collide with the load/unload ramp, for example, and a portion of the load/unload ramp chips off, thus producing foreign matter, scratching the magnetic disks, and the like, which causes failures. The impact resistance increases as the maximum amount of flex of the substrate decreases.

It was found that, when the flat surface height H1 of the magnetic disk substrate 31 that contacts the outer circumference of the spacer 80 is less than the flat surface height H2 of the magnetic disk substrate 31 that contacts the inner circumference of the spacer 80, the maximum amount of flex of the magnetic disk substrate 31 is small and the impact resistance is excellent. In particular, it was found that, when the difference (H1−H2) between the flat surface height H1 of the magnetic disk substrate 31 that contacts the outer circumference of the spacer 80 and the flat surface height H2 of the magnetic disk substrate 31 that contacts the inner circumference of the spacer 80 is −3.0 μm or less, the impact resistance is even more excellent. It was also found that, even in cases in which the thickness is 0.35 mm, as when the thickness is 0.50 mm, when the flat surface height H1 is less than the flat surface height H2, the maximum amount of flex of the magnetic disk substrate 31 is small and the impact resistance is excellent. Due to this, it is thought that, when the flat surface height H1 is less than the flat surface height H2, the maximum amount of flex of the magnetic disk substrate 31 is small and the impact resistance is excellent, regardless of the thickness. Meanwhile, when the flat surface height H1 of the magnetic disk substrate 31 that contacts the outer circumference of the spacer 80 is greater than the flat surface height H2 of the magnetic disk substrate 31 that contacts the inner circumference of the spacer 80, the maximum amount of flex is great and the impact resistance is inferior.

Thus, it was found that, when the flat surface height H1 of the upper surface of the magnetic disk substrate 31 that contacts the outer circumference of the spacer 80 is less than the flat surface height H2 of the upper surface of the magnetic disk substrate 31 that contacts the inner circumference of the spacer 80, the impact resistance can be enhanced while leaving the thickness of the magnetic disk substrate 31 as-is. Note that the magnetic disk substrate 31 differs from the magnetic disks 30 in that the magnetic disk substrate 31 does not include the magnetic layer and the like, but is thought to be equivalent to the magnetic disks 30 with regards to impact resistance and the like.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2021-035203, filed on Mar. 5, 2021, the entire disclosure of which is incorporated by reference herein.

REFERENCE SIGNS LIST

10 Housing
20 Base
30 Magnetic disk
31 Magnetic disk substrate

40 Head stack assembly
41 Arm
42 Head
50 Voice coil motor
60 Load/unload ramp
70 Clamp
71 Protrusion
72 Fastening member
80 Spacer
81, 82 Chamfer
83 Contact section
90 Hub
91 Small diameter section
92 Large diameter section
100 Magnetic disk device
D Depth
W Width
H Height
N Number
Z Rotational axis
Rd Outer radius
Td, Ts Thickness
T Stacked height
Rsi, Rssi Inner radius
Rso, Rsso Outer radius

The invention claimed is:

1. A magnetic disk device comprising:
a plurality of disk-shaped magnetic disks, each including a through-hole in a center section thereof;
a spacer that is disposed among the magnetic disks and that includes a through-hole in a center section thereof;
a hub inserted into the through-holes of the magnetic disks and the spacer; and
a clamp pressing and holding the magnetic disks and the spacer, wherein
at surfaces where the magnetic disks and the spacer or the clamp contact, a flat surface height of an upper surface of at least one magnetic disk of the magnetic disks that contacts an outer circumference of the spacer or the clamp is lower than a flat surface height of the upper surface of the at least one magnetic disk of the magnetic disks that contacts an inner circumference of the spacer or the clamp; and
a first gap formed between the upper surface of the at least one magnetic disk and the spacer or the clamp at said outer circumference of the spacer or the clamp, and a second gap formed between a lower surface of the at least one magnetic disk and the spacer at said inner circumference of the spacer.

2. The magnetic disk device according to claim 1, wherein each of the magnetic disks has a thickness of 0.48 mm or less.

3. The magnetic disk device according to claim 1, wherein each of the magnetic disks has a thickness of 0.36 mm or less.

4. The magnetic disk device according to claim 1, wherein for at least a magnetic disk disposed uppermost of the plurality of magnetic disks, at the surfaces where the magnetic disk and the clamp contact, the flat surface height of the upper surface of the magnetic disk that contacts the outer circumference of the clamp is lower than the flat surface height of the upper surface of the magnetic disk that contacts the inner circumference of the clamp.

5. The magnetic disk device according to claim 4, wherein each of the magnetic disks has a thickness of 0.48 mm or less.

6. The magnetic disk device according to claim 4, wherein each of the magnetic disks has a thickness of 0.36 mm or less.

7. The magnetic disk device according to claim 1, wherein at the surfaces where the magnetic disks and the spacer or the clamp contact, a difference between the flat surface height of the upper surface of the at least one magnetic disk of the magnetic disks that contacts the outer circumference of the spacer or the clamp and the flat surface height of the upper surface of the at least one magnetic disk of the magnetic disks that contacts the inner circumference of the spacer or the clamp is −3.0 μm or less.

8. The magnetic disk device according to claim 7, wherein each of the magnetic disks has a thickness of 0.48 mm or less.

9. The magnetic disk device according to claim 7, wherein each of the magnetic disks has a thickness of 0.36 mm or less.

10. The magnetic disk device according to claim 7, wherein for at least a magnetic disk disposed uppermost of the plurality of magnetic disks, at the surfaces where the magnetic disk and the clamp contact, the flat surface height of the upper surface of the magnetic disk that contacts the outer circumference of the clamp is lower than the flat surface height of the upper surface of the magnetic disk that contacts the inner circumference of the clamp.

11. The magnetic disk device according to claim 10, wherein each of the magnetic disks has a thickness of 0.48 mm or less.

12. The magnetic disk device according to claim 10, wherein each of the magnetic disks has a thickness of 0.36 mm or less.

13. A method for manufacturing a magnetic disk device including a plurality of disk-shaped magnetic disks, each including a through-hole in a center section thereof, a spacer that is disposed among the magnetic disks and that includes a through-hole in a center section thereof, a hub inserted into the through-holes of the magnetic disks and the spacer, and a clamp pressing and holding the magnetic disks and the spacer, the method comprising:
measuring a flat surface height of an upper surface of at least one magnetic disk of the magnetic disks that contacts an outer circumference of the spacer or the clamp, and a flat surface height of the upper surface of the at least one magnetic disk of the magnetic disks that contacts an inner circumference of the spacer or the clamp; and
inserting the magnetic disks on the hub in an arrangement at which the flat surface height of the upper surface of the at least one magnetic disk of the magnetic disks that contacts the outer circumference of the spacer or the clamp is lower than the flat surface height of the upper surface of the at least one magnetic disk of the magnetic disks that contacts the inner circumference of the spacer or the clamp.

* * * * *